F. HEATH.
SYNCHRONIZER.
APPLICATION FILED JUNE 15, 1915.
1,292,315.
Patented Jan. 21, 1919.
2 SHEETS—SHEET 2.
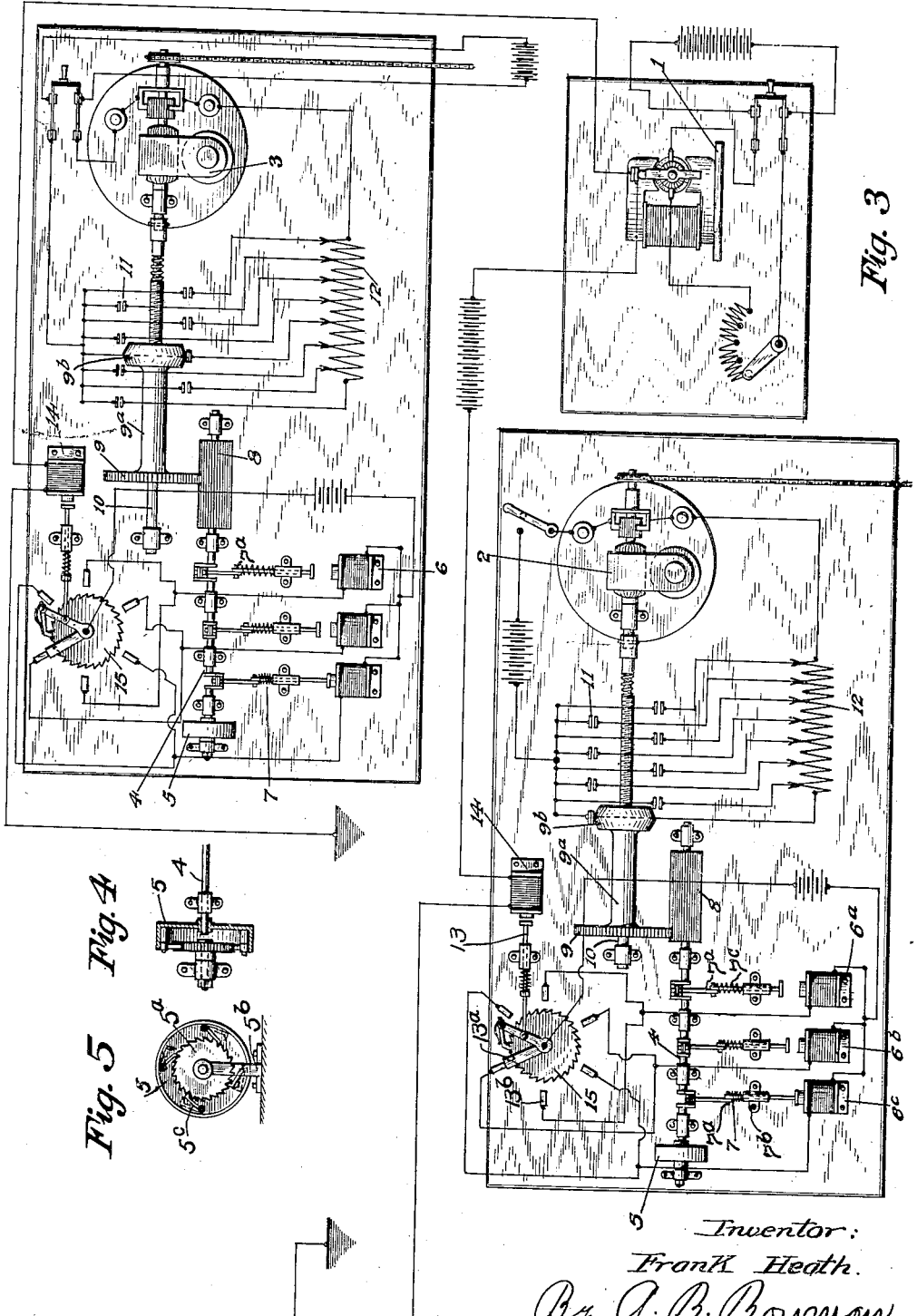
Inventor:
Frank Heath.
By A. B. Bowman
Atty

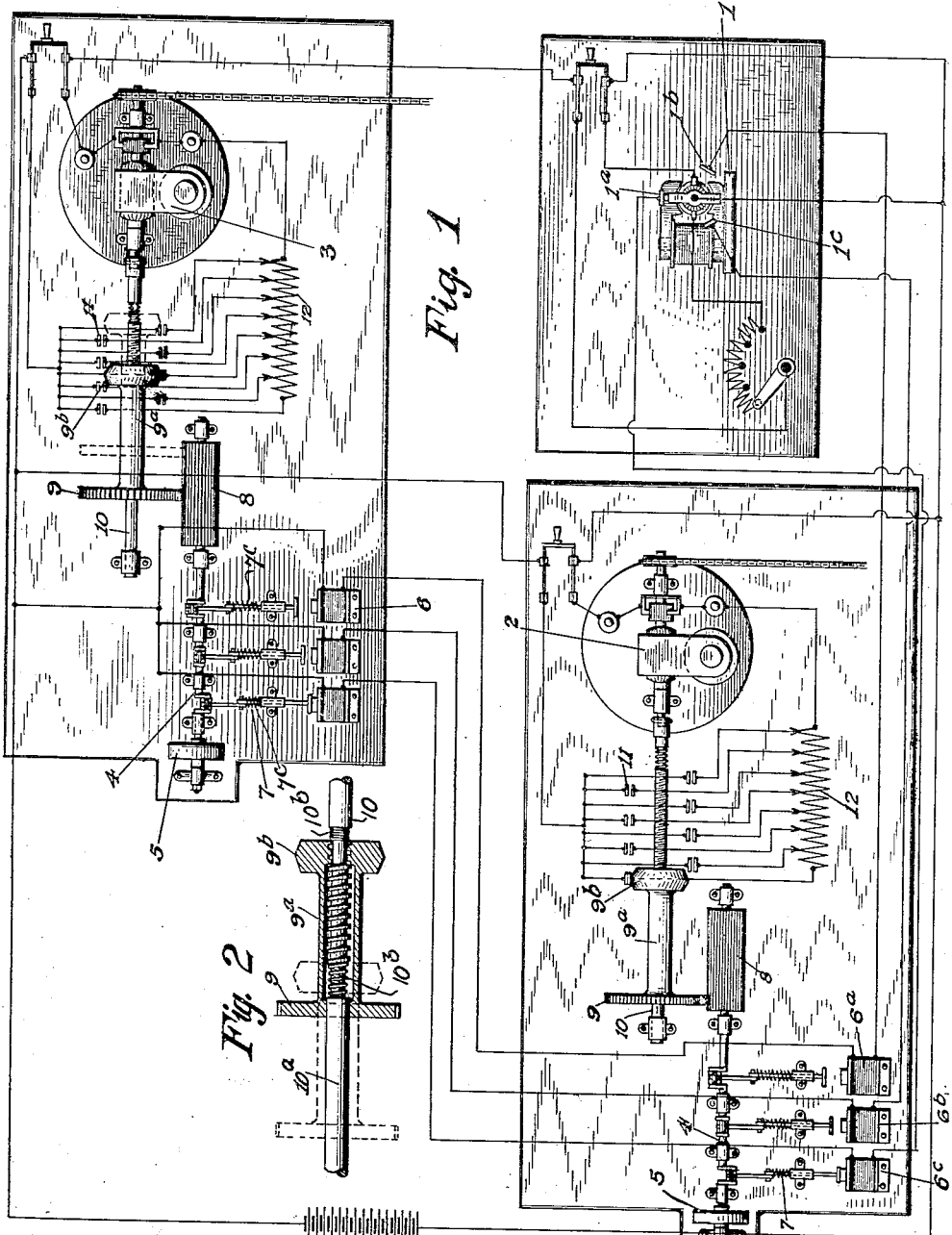

UNITED STATES PATENT OFFICE.

FRANK HEATH, OF NATIONAL CITY, CALIFORNIA.

SYNCHRONIZER.

1,292,315.  Specification of Letters Patent.  Patented Jan. 21, 1919.

Application filed June 15, 1915. Serial No. 34,269.

*To all whom it may concern:*

Be it known that I, FRANK HEATH, a citizen of the United States, residing at National City, in the county of San Diego and State of California, have invented certain new and useful Improvements in Synchronizers, of which the following is a specification.

My invention relates to synchronizers to be used for keeping two or more motors running at the same speed or the same relative speed as pre-determined, either when close together or spaced a considerable distance apart, and the objects of my invention are, first, to provide a synchronizer of this class which is simple of construction and positive in its action, second, to provide a synchronizer that will synchronize two or more motors of any class whether close together or separated at a considerable distance; third, to provide a synchronizer which will not readily get out of order and which is easy of operation, and fourth, to provide a synchronizer of this class which is sensitive, thus providing uniform speed of the different motors.

With these and other objects in view, as will appear hereinafter, my invention consists of certain novel features of construction, combination and arrangement of parts as will be hereinafter described in detail and particularly set forth in the appended claims, reference being had to the accompanying drawings and to the characters of reference thereon, which form a part of this specification, in which:

Figure 1 shows three electrical motors electrically connected together, one of which is the control motor and the other two in connection therewith are power motors; Fig. 2 is a detailed sectional view of the mechanical connecting means for regulating the power motors; Fig. 3 is a plan view of three motors electrically connected together, shown in a slightly modified form from that in Fig. 1; Fig. 4 is a detailed sectional view showing the ratchet wheel and pawl connection for the regulating motors, and Fig. 5 is a side elevational view thereof.

The control motors 1, power motors 2 and 3, shafts 4, control wheels 5, magnets 6, plungers 7, pinions 8, gears 9, shafts 10, switches 11, resistance coils 12, plungers 13, magnets 14 and ratchets 15, constitute the principal parts of my synchronizer.

In Fig. 1, I have shown three motors electrically connected together; the controlling one being represented by numeral 1. Motors 2 and 3 are the power motors and run at the same speed as the control motor. The control motor 1 shown in Fig. 1 is provided with three switch connections $1^a$, $1^b$ and $1^c$, with which it engages consecutively in its revolutions. These switches are electrically connected to the magnets $6^a$, $6^b$ and $6^c$, which in turn operate the plungers 7 which are pivotally mounted on the shaft 4 at one of their ends and are provided with joints $7^a$ so as to allow a portion thereof to reciprocate in the bearings $7^b$ and each is provided with a spring $7^c$ to facilitate the movement of the plunger backward when released by the magnets 6. On the one end of this shaft 4 is secured the long faced pinion 8 which engages with the gear 9, which is provided with an extended hub $9^a$ on the end of which is an annular flange $9^b$ which is provided with a double beveled surface adapted to engage with the switches 11. This hub $9^a$ is internally threaded at one of its ends, adapted to fit an external thread on the shaft 10, so that if the motor 2 is running at the same speed as the motor 1, this hub $9^a$ will maintain its same relative position on the shaft 10; but if the motor 2 should be running slightly slower, the hub $9^a$ will move toward the motor 2 on the shaft 10, closing the switches to the wires running to the resistance coil 12, thus forming a rheostat for controlling the current to the motor 2, the resistance being lessened by the moving of the hub $9^a$ toward the motor 2, by reason of the current short circuiting through wherever closed, will cause the motor 2 to pick up; thus the speed will be equalized at all times. On the shaft 10 is secured a sleeve $10^a$ adapted to be removed in placing and removing the gear 9 on the shaft 10 and mounted on said shaft 10, at each end of the threaded portion, is a spring $10^b$ for the purpose of starting the gear piece 9 on the threaded portion if it should turn clear off at either end. The ratchet wheel $5^a$, as shown best in Figs. 4 and 5, is secured to the support $5^b$ and is for the purpose of preventing the shaft from turning in the wrong direction when starting and it will be noted that the ratchet pawls $5^c$ are pivotally mounted on the wheel so that when said wheel reaches a certain velocity they are thrown out of engagement with the ratchet wheel by centrifugal force.

It will be noted that the two different sets of magnets constituting the motors for regulating the two power motors are electrically connected in series and controlled by the control motor 1. If it is desired to synchronize a large number of motors a large number of sets of magnets constituting regulating motors are used and electrically connected anywhere between the two sets of magnets on the wires connecting these two sets of magnets and the secondary motors will all be synchronized.

The control motor is in series with one of the power motors in Fig. 1, but not in Fig. 3, for the reason that it might be preferable in some cases, especially where the power motor and the control motors and located at a great distance apart to provide a local circuit for each unit consisting of a regulating and power motor and also for the control motor and to use more sources of electrical energy and only one main line wire.

In the modified form shown in Fig. 3 the construction is slightly different to provide for synchronizing at a long distance, in which case only one connecting wire is used and the wires are grounded and an extra magnet 14 is used which connects with a ratchet wheel 15 by means of plunger 13 which is constructed and operates similar to the plunger 7, heretofore described and this ratchet wheel is provided with an extended arm 13$^a$ forming a switch contact adapted to contact with the switches 13$^b$ in its revolution, each pulsation of the magnet moving the ratchet wheel one notch and the magnets are electrically connected to this ratchet wheel and its engaging switches instead of the primary motor.

The operation of my synchronizer is as follows: The motor 1 in running engages the switches 1$^a$, 1$^b$ and 1$^c$ which in turn operate the magnets 6$^a$, 6$^b$ and 6$^c$ causing the reciprocation of the plunger 7 revolving the shaft 4, and the magnets, plungers and shafts in connection with both motors 2 and 3 being electrically connected together operate at the same speed so that the pinion 8 in connection with each of these motors revolve at the same speed. The gears 9 engaging said pinions 8 move backwardly and forwardly on the shaft 10 depending on the relative speed of the gear 9 and the motor 2, and in its movement back and forth the flange 9$^b$ engages the switches 11 controlling the quantity of current to the motors 2 and 3 in accordance with the relative speed of the motor with the gear 9, the current being increased when the flange 1$^b$ moves in one direction and decreased when it moves in the opposite direction so that the motors 2 or 3 or any number connected in the same way as the motors 2 and 3 will run at the same speed at all times.

Though I have shown and described a particular construction, combination and arrangement for mechanically and electrically operating a rheostat for controlling the speed of motors and to synchronize them, I do not wish to be limited to this particular construction, combination and arrangement, but desire to include in the purview of my invention, the construction, combination and arrangement substantially as set forth in the appended claims.

It is obvious that with this construction there is provided a synchronizer which is very sensitive and thereby will keep two or more motors, whether near or widely separated, running at practically the same speed or the same relative speed; that the device is simple, easily constructed and easily operated; that the modification shown in Fig. 3 simply shows a slight addition in cases where the motors are widely separated.

Having thus described my invention what I claim as new and desire to secure by Letters Patent, is:

1. In synchronizers the combination of a control motor, a regulating motor, comprising a plurality of electro-magnets charged consecutively by means of said control motor, plungers reciprocated by said magnets and a shaft driven by said plungers, a power motor, a screw secured to the shaft of said power motor, a nut in connection with said regulating motor adapted to screw on said screw, means in connection with said power motor for regulating said power motor and means on said nut adapted to engage with said means.

2. In synchronizers the combination of a power motor, a regulating motor comprising, a plurality of electro-magnets charged consecutively, plungers reciprocated by said magnets and a shaft driven by said plungers and means for making said regulating motor and power motor run a certain relative speed to each other, comprising a screw secured to said power motor, a nut controlled by the regulating motor adapted to run on said screw and a rheostat controlled by said nut for controlling the current to said power motor, whereby said motors are made to run at the same relative speed to each other.

3. In synchronizers, the combination of a control motor, a regulating motor comprising a plurality of electro-magnets charged consecutively, plungers reciprocated by said magnets and a shaft driven by said plungers, a power motor, a screw on said power motor, a gear provided with a hub adapted to screw thereon, a pinion mounted on said regulating motor adapted to engage with said gear, and a rheostat for controlling said power motor operated by said gear hub.

4. In synchronizers, the combination of a control motor, a plurality of switches adapted to be opened and closed by said control motor, a regulating motor comprising a plurality of magnets in series connection with said switches, a plurality of plungers adapted to be reciprocated by said magnets, a shaft connected to said plungers, a pinion secured to said shaft, a power motor carrying a shaft with a screw thereon, a gear carrying a nut adapted to screw on the screw on said shaft and engage with said pinion and a rheostat operated by the longitudinal movement of the gear on said screw for controlling said power motor.

In testimony whereof I have hereunto set my hand at San Diego, California, this 9th day of June, 1915.

FRANK HEATH.